Patented Feb. 27, 1940

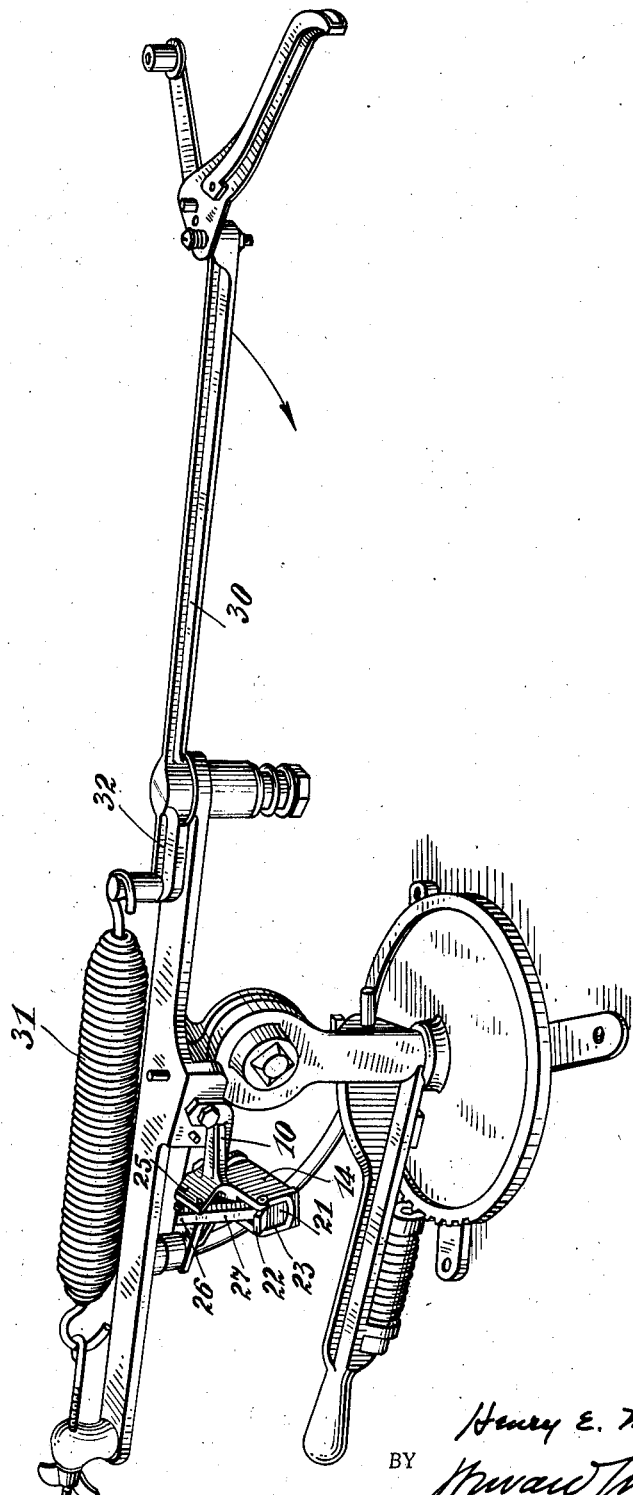

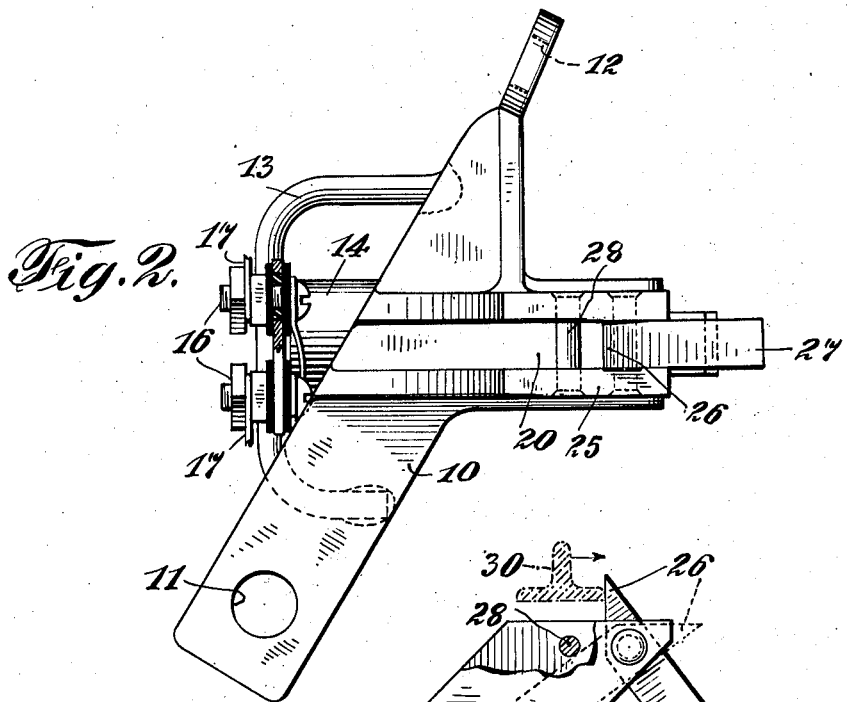
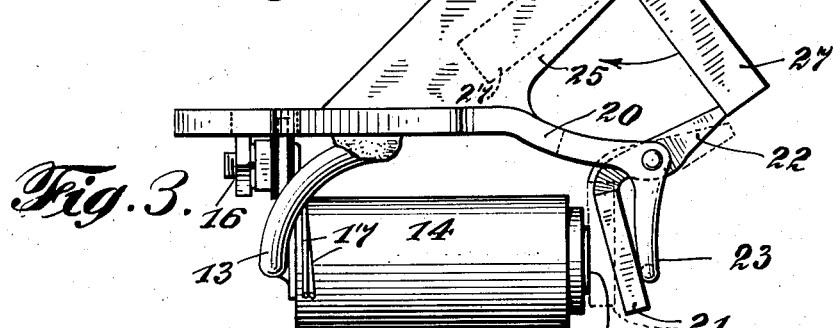
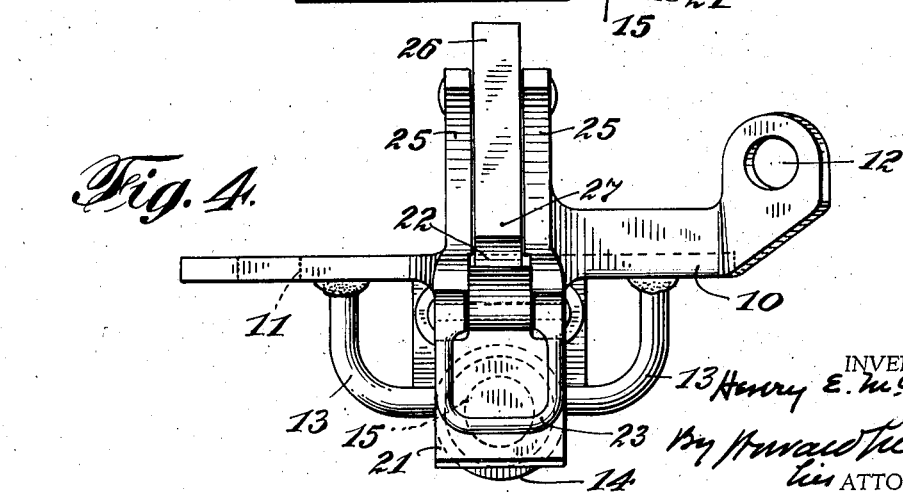

2,191,618

UNITED STATES PATENT OFFICE 2,191,618

ATTACHMENT FOR TARGET TRAPS

Henry E. McKenzie, Yemassee, S. C.

Application July 28, 1938, Serial No. 221,661

4 Claims. (Cl. 124—8)

My invention relates to target traps, and refers particularly to electrical means for tripping readily and effectively the carrier-arm of such traps.

My invention has for an object the provision of a double-acting, electrically-actuated trigger element; and, also, to provide a release mechanism in which springs are eliminated, the various elements thereof being positioned normally under the action of gravity.

A further object of my invention is to provide the release mechanism in the form of an attachment which may conveniently and readily be secured to the frame of a target trap without requiring alteration therein, a suitable latch of the release mechanism being adapted for engagement directly with the carrier-arm of the trap in the usual manner.

In carrying out my invention, the release mechanism is supported upon a suitable bracket adapted for attachment to the frame of a target trap. This bracket carries an electromagnet as well as a trigger element in the nature of a bell-crank having one arm swinging under the action of gravity in juxtaposition to the pole of the electromagnet, while its other arm constitutes a trigger for engagement with one arm of an associated gravity-actuated lever, also carried by the bracket. The other arm of the lever constitutes a latch for engagement with the usual carrier-arm, or throw-arm, of the trap as the same is manually brought over the latter in the usual manner and in opposition to the force exerted by a spring attached thereto and to the trap frame. Provision is made, also, to limit the outward excursion of the armature so as to maintain the same always within the field of attraction of the associated electromagnet.

The nature of my invention, however, will best be understood when described in connection with the accompanying drawings, in which:

Figure 1 is a view, in perspective, of a target trap equipped with my novel release mechanism.

Figure 2 is a plan view of my novel attachment.

Figure 3 is a side elevation thereof and shows also (in section) a portion of the carrier-arm of a trap with which the release mechanism is associated, as well as illustrating the position of the carrier-arm as set thereby.

Figure 4 is an end elevation.

Referring to the drawings, 10 designates a bracket suitably shaped for convenient attachment to the frame of a target trap, as indicated in Figure 1 of the drawings, said bracket being to this end perforated as at 11 and 12 to pass suitable fastening means. A sub-bracket 13 supports upon the underside of bracket 10 an electromagnet 14 having the pole piece 15 and suitable terminals 16 for introducing electric current to energize said electromagnet, as through the leads 17.

A forwardly directed and bifurcated extension 20 pivotally supports between the arms of said extension a bell-crank comprising the lower and heavier arm 21 swinging under the action of gravity in juxtaposition to the pole piece 15 of the electromagnet and constituting an armature. The upper arm 22 of the bell-crank constitutes a trigger for a latch member herein- after more fully set forth. The said extension affords, also, a down-turned portion 23 constituting a stop to limit the outward excursion of the armature 21 so that the same will be maintained always within the field of attraction of said electromagnet; and, when the latter is energized, said armature will be drawn toward the pole piece thereof.

An upward and bifurcated extension 25 of the bracket has pivoted thereto, as between its arms, the latch member which comprises an upper arm or latch 26 and a lower and heavier arm 27 juxtaposed to and adapted for engagement with the trigger 22. The latch member is adapted to swing freely under the action of gravity but is limited in its inward excursion by a pin 28 supported transversely in the arms of the extension 25. Being thus freely suspended, the latch member will readily pass the carrier-arm 30, of a lever when the arm is drawn thereover in the direction indicated by the arrow, Figure 1 of the drawings, to engage the arm through its inclined surface when said arm has passed over the said latch portion 26. This portion is depressed as said arm rides thereover but springs promptly back into position under the action of gravity to check return of the carrier-arm under the action of a spring 31 attached to the other 32 of the lever and to the frame. Return movement of the arm 27 to a vertical position is checked by engagement of said arm with the trigger 22, positioned in the path of movement of said arm 27 under the action of gravity, so that the release device becomes set with the carrier-arm locked in position and under tension of the spring 31.

To release or trip the carrier-arm 30, it is necessary merely to energize the electromagnet 14 through leads 17 from a suitable source of electric current (not shown). This will cause armature 21 to be attracted to the pole piece 15, the bell-crank moving thereby to the position indicated by the dotted lines, Figure 3, to free the latch member, its arm 27 moving in the direction of the arrow substantially to the position indicated by the dotted lines until limited by the stop pin 28. This action withdraws the latch portion 26 from the path of travel of the carrier-arm allowing the latter to clear the latch and hurl the target.

By the construction hereinbefore described, the trigger member as well as the latch member is gravity-acting and the two members operate very effectively both in the setting of the device and in the release of the carrier-arm.

It will thus be seen that my invention presents a tripping device for target traps which is simple in construction, free from springs, readily attachable to target traps and positive and effective in operation.

I do not limit myself to the particular size, shape, number or arrangement of parts as illustrated and described, as these are given solely for the purpose of clearly describing the device of my invention.

What I claim is:

1. An attachment for latching and releasing the carrier-arm of a target trap, comprising a bracket adapted to be secured to the trap, an electromagnet carried by said bracket, a pivoted, gravity-actuated trigger member carried by said bracket and having a portion juxtaposed to the pole of said electromagnet for attraction thereto, and a pivoted, gravity-actuated latch member carried by said bracket having a portion juxtaposed to a different portion of said trigger and adapted to engage said trigger and having a further and beveled end portion engaged by said carrier-arm which is adapted to ride thereover in both directions of its travel to cock the latch member in one direction and contact the beveled face in the opposite direction to hold the carrier-arm against movement until the trigger member is operated.

2. An attachment for latching and releasing the carrier-arm of a target trap, comprising a bracket adapted to be secured to the trap and provided with an extension; an electromagnet carried by said bracket; a bell-crank pivoted to said extension, the lower arm thereof constituting an armature swinging under the action of gravity and juxtaposed to a pole of said electromagnet and its upper arm constituting a trigger, said extension affording a portion constituting a stop adapted to limit the outward excursion of said armature and maintain the same within the field of attraction of the said electromagnet; together with a gravity-actuated lever pivotally carried by said bracket above said bell-crank, one arm of the lever constituting a latch beveled at its end and engaged by the carrier arm which is adapted to ride thereover in both directions of its travel to cock the lever in one direction and contact the beveled face in the opposite direction to hold the carrier-arm against movement until the trigger is operated.

3. An attachment for latching and releasing the carrier-arm of a target trap, comprising a bracket adapted to be secured to the trap; an electromagnet carried by said bracket at its underside, said bracket being provided with a forwardly directed bifurcated extension; a bell-crank pivoted between the arms of said extension and the lower arm thereof constituting an armature swinging under the action of gravity and juxtaposed to a pole of said electromagnet and its upper arm constituting a trigger, said extension affording a downturned portion constituting a stop adapted to limit the outward excursion of said armature and maintain the same within the field of attraction of said electromagnet and in a cocking position; together with a gravity-actuated lever pivotally carried by an upward extension of said bracket above said bell-crank, one arm of the lever constituting a latch beveled at its end and engaged by said carrier-arm which is adapted to ride thereover in both directions of its travel to cock the lever in one direction and contact the beveled face in the opposite direction to hold the carrier-arm against movement until the trigger is operated.

4. An attachment for latching and releasing the carrier-arm of a target trap, comprising a bracket adapted to be secured to the trap; an electromagnet carried by said bracket at its underside, said bracket being provided with a forwardly directed bifurcated extension; a bell-crank pivoted between the arms of said extension and the lower arm thereof constituting an armature swinging under the action of gravity and juxtaposed to a pole of said electromagnet and its upper arm constituting a trigger, said extension affording a down-turned portion constituting a stop to limit the outward excursion of said armature and maintain the same within the field of attraction of said electromagnet and in a cocking position; together with a gravity-actuated lever pivotally carried by an upward extension of said bracket above said bell-crank, one arm of the lever constituting a latch beveled at its end and engaged by said carrier-arm which is adapted to ride thereover in both directions of its travel to cock the lever in one direction and contact the beveled face in the opposite direction to hold the carrier-arm against movement until the trigger is operated, and its other arm being juxtaposed to and adapted for engagement with said trigger, and means carried by said upward extension adapted to limit the inward movement of said trigger-engaging arm.

HENRY E. McKENZIE.